O. ROCHEFORT.
WIRELESS TELEGRAPHY OR WIRELESS TELEPHONY.
APPLICATION FILED NOV. 8, 1909.

972,721.

Patented Oct. 11, 1910.

WITNESSES
Laura H. Keane
Ida W. Stanley

INVENTOR
Octave Rochefort
BY
Emile Bainbridge
ATTORNEY

UNITED STATES PATENT OFFICE.

OCTAVE ROCHEFORT, OF PARIS, FRANCE, ASSIGNOR TO COMPAGNIE GÉNÉRALE RADIO-TELEGRAPHIQUE CARPENTIER, GAIFFE, ROCHEFORT, OF PARIS, FRANCE.

WIRELESS TELEGRAPHY OR WIRELESS TELEPHONY.

972,721.  Specification of Letters Patent.  Patented Oct. 11, 1910.

Application filed November 8, 1909. Serial No. 526,794.

*To all whom it may concern:*

Be it known that I, OCTAVE ROCHEFORT, a citizen of the Republic of France, and resident of Paris, Seine, France, have invented new and useful Improvements in or Relating to Wireless Telegraphy or Wireless Telephony, which improvements are fully set forth in the following specification.

Reference is had to the accompanying drawings, forming part of this application, and in which:—

Figure 2:
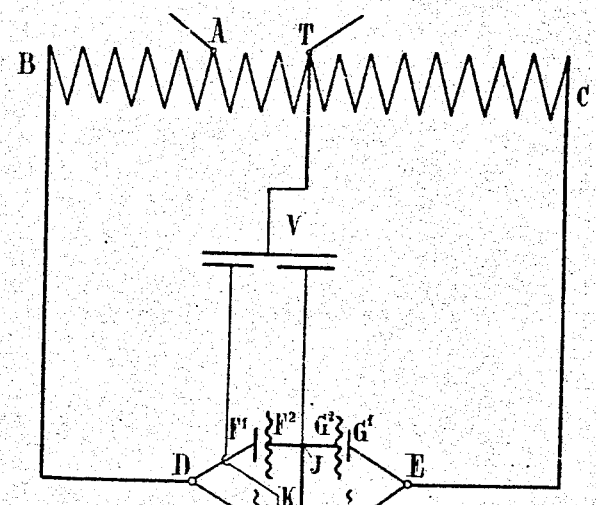
Figure 4:
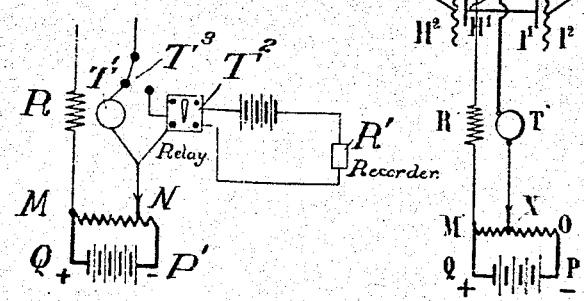
Figure 3:
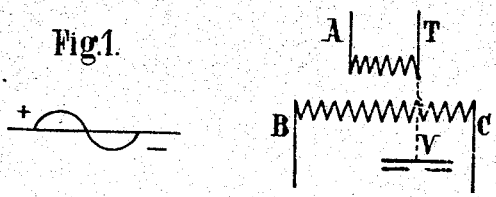
Figure 1:
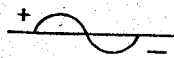

Figure 1 is a diagram showing the wave form of a complete Hertzian oscillation; Fig. 2 is a diagram illustrating the novel combination of parts constituting my invention; Fig. 3 is a diagram illustrating a slightly different form of resonator; and, Fig. 4 is a diagram illustrating a modified arrangement of receiving devices.

In wireless telegraphy and wireless telephony receiving apparatus Hertzian waves detectors which are at the same time electric valves or rectifiers are often used; such as the electrolytic detectors of Ferrie, the valve of Fleming and the "audion" of de Forest. The most usual of these detectors is the Ferrie electrolytic detector consisting of a metal point or a metal disk in contact with an electrolyte. A source of suitable potential being arranged with its positive pole connected to the metal, and its negative pole connected to the electrolyte, the rectifier represents in these conditions a certain apparent electrical resistance. If the metal portion of the electrolytic receiver is connected to an antenna electrically vibrated by Hertzian waves, either by a direct or indirect system, the apparent resistance of the electrolytic receiver will be modified. This change of apparent resistance which may be due to a polarization effect is in fact brought about by the very rapid alternating current, only a portion of which is allowed to pass by the valve. Even if a complete phase of vibration of the antenna be considered, as shown in Fig. 1, it will be seen that the rectifier will work only during the first half of a Hertzian oscillation, during which half the metal portion is positive.

The principle of the bipolar reception forming the subject of the French patent of the 3rd July, 1903 No. 332743, is applied in the present invention and follows from the same.

The invention consists in arranging the receiving rectifiers which are assumed in this case to be electrolytic receivers and of which there are four, as shown in Fig. 2. The metal is at $F'$, the contact with the electrolyte being at $F^2$ for the first. In the same way $G'$ is the metal and $G^2$ the electrolyte for the second, $I'$ the metal and $I^2$ the electrolyte for the third, and $H'$ the metal and $H^2$ the electrolyte for the fourth. $F'$ and $H^2$ are connected at D to the end B of the bipolar resonator B A C T. $G^1$ and $I^2$ are connected at E to the end C of the bipolar resonator. A is the contact with the antenna, T the earth connection of the resonator which is supposed to be here an Oudin resonator with tight or close coupling, which can be replaced without difficulty as in Fig. 3, by a Tesla resonator with loose or weak coupling in which the primary A T is not a shunt of the resonator, but a winding independent of it. $F^2$ and $G^2$, $H^1$ and $I'$ are electrically connected, and the two contacts J and K are the starting points of an electric circuit on a source of continuous current Q P the potential of the said source being reduced by the whole forming a potentio-meter of the fixed resistance M O provided with a variable slider N. Between K and M is inserted a resistance R chiefly intended to modify the amperes of the current, and at $T'$ is a telephonic receiver. This arrangement of the four rectifiers for a wireless telegraphy or wireless telephony receiving apparatus and the application of a continuous source of current as just described, constitutes the invention. If a Hertzian wave strikes the antenna and vibrates the primary A T, the vibration in question will produce at B D and C E an induced alternating current, and in view of the arrangement of the rectifiers and of that of the continuous source of current it will be seen that, with B positive and C negative, the rectifiers F and I will change their resistance, while the rectifiers G and H will change their resistance for C positive and B negative. It follows therefrom that at each alternation of the current, there will be always a change of resistance in the continuous current circuit. There is, therefore, complete utilization at each moment of the whole alternating current produced in the resonator and the said current produces in the continuous current circuit K R M N T' J an undulating current during the whole time of the action of the Hertzian wave. If at T' is placed a telephonic receiver, the undulations of the said current, obtained from the continuous source Q P, will be detected or made apparent by vibrations of the diaphragm producing the characteristic sounds which enable the signals transmitted to be read by the sound. If a relay used for written receptions in wireless telegraphy, is substituted for the telephone receiver T', as shown at T² in Fig. 4, the action of the undulating current will be such that the relay will work or be operative during the whole duration of a signal and by means of processes usually employed, will enable the signals received to be written for instance on the band of a Morse apparatus, included in a local circuit, as indicated at R' in Fig. 4. It will be very easy to have at T' a switch such as T³ in Fig. 4 by means of which it will be possible to use either a telephonic receiver or a relay T² in order not to disturb anything, the telephonic receiver and the relay having the same resistance. If the Morse receiver which can be provided with an automatic unwinding device, is replaced by a bell, we will have the notifier of signals received by means of a detector rectifier which has been sought for a long time.

In certain cases, it is advisable to put at T K and J a condenser V with three contacts, which increases the effect of the Hertzian waves on the four electrolytic receivers.

Having now particularly described and ascertained the nature of my said invention and in what manner the same is to be performed, I declare that what I claim is:—

1. In a wireless telephone or telegraph receiver, an oscillation circuit having two parallel branches, a pair of electrolytic rectifiers in each branch, arranged in opposition, and a receiving circuit, tapping each branch between said rectifiers, said circuit including a source of continuous current and a signaling device.

2. In a wireless telephone or telegraph receiver, a receiving circuit including a source of continuous current and a signaling device, and comprising two branches in parallel, a pair of electrolytic rectifiers in each branch arranged in series so that the current divides and flows through both branches, traversing all four rectifiers continuously, a bipolar resonator, and connections between said resonator and rectifier whereby each oscillation in either direction affects one of the rectifiers in each branch.

3. In a wireless telephone or telegraph receiver, a bipolar resonator, a circuit connected with the ends thereof and having two parallel branches, a pair of electrolytic detectors in each branch, arranged in opposition, a receiving circuit tapping each branch between said detectors, and a pair of condensers having one side connected to a common point in the resonator, intermediate its end, and the other of each condenser side to one of said parallel branches between said detectors.

4. Improvements in wireless telegraphy or wireless telephony receptions, consisting in arranging four detectors forming electric rectifiers connected so as to arrange between the earth of the bipolar resonator and the ends of the circuit of the telephonic receiver, a condenser with three contacts.

In testimony whereof I have signed this specification in the presence of two subscribing witnesses.

OCTAVE ROCHEFORT.

Witnesses:
EMILE LEDRET,
H. C. COXE.